US009463703B1

(12) United States Patent
Timblin

(10) Patent No.: US 9,463,703 B1
(45) Date of Patent: Oct. 11, 2016

(54) CIGARETTE LIGHTER ADAPTOR

(71) Applicant: Sandra Timblin, Boulder City, NV (US)

(72) Inventor: Sandra Timblin, Boulder City, NV (US)

( * ) Notice: Subject to any disclaimer, the term of this patent is extended or adjusted under 35 U.S.C. 154(b) by 0 days.

(21) Appl. No.: 14/753,279

(22) Filed: Jun. 29, 2015

Related U.S. Application Data

(60) Provisional application No. 62/018,916, filed on Jun. 30, 2014.

(51) Int. Cl.
*H01R 31/06* (2006.01)
*H01R 24/58* (2011.01)
*B60L 11/18* (2006.01)
*H01R 31/02* (2006.01)

(52) U.S. Cl.
CPC ........... *B60L 11/1818* (2013.01); *H01R 31/02* (2013.01)

(58) Field of Classification Search
CPC ....... H01R 31/06; H01R 24/58; H01R 33/90
See application file for complete search history.

(56) References Cited

U.S. PATENT DOCUMENTS 4,109,988 A * 8/1978 Olson .................... H01R 31/02 439/265
4,248,494 A * 2/1981 McDonald ............. H01R 31/02 439/638
5,007,863 A * 4/1991 Xuan ..................... H01R 31/02 439/639
D359,269 S 6/1995 Wharton
5,690,509 A 11/1997 Eisenbraun
6,478,628 B1 * 11/2002 Ming ....................... B60N 3/14 439/640
7,351,111 B2 4/2008 Cheng
7,500,881 B1 3/2009 Lin
7,902,691 B2 * 3/2011 Sayed ................... H02J 7/0042 307/9.1
D715,226 S * 10/2014 Rostami ........................ D13/144
D723,466 S * 3/2015 Wang ........................... D13/110
2002/0119708 A1 * 8/2002 Eisenbraun ............ H01R 24/58 439/668
2007/0249216 A1 * 10/2007 Cheng .................... H01R 27/02 439/490
2013/0078832 A1 * 3/2013 Vardanyan ............. H01R 27/00 439/131
2013/0342158 A1 * 12/2013 Zhong ................ H01R 13/6675 320/107
2014/0269649 A1 * 9/2014 Lockerbie ............. H02J 7/0045 370/338
2015/0111431 A1 * 4/2015 Wentink ............. H01R 13/7137 439/620.08

FOREIGN PATENT DOCUMENTS

GB 2388968 A 11/2003

* cited by examiner

*Primary Examiner* — Gary Paumen

(57) ABSTRACT

The cigarette lighter adaptor includes a housing having a first end and a second end. The first end of the device is a conventional plug that is adapted to plug into a power outlet disposed on a vehicle's dashboard. The first end of the device has a pair of exposed electrical contacts to complete the circuit to the automobile's 12 V DC electrical power source, thereby providing the present invention with power. The second end of the present invention comprises a DC cigarette lighter and a power outlet.

2 Claims, 3 Drawing Sheets

CIGARETTE LIGHTER ADAPTOR

CROSS REFERENCES TO RELATED APPLICATIONS

This non-provisional patent application claims priority to provisional patent application 62/018,916 that was filed on Jun. 30, 2014.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle cigarette lighters, more specifically, accessories that plug into a cigarette lighter outlet, and which provide electricity to other electrical devices.

Many new cars do not come equipped with a cigarette lighter as a standard feature. This can be a nuisance for drivers that want to light a cigarette because it forces the driver to search for a cigarette lighter, which can deviate focus from the road. Therefore, there is a need in the prior art for a cigarette lighter that is adapted for use in automobiles that lack a conventional cigarette lighter receptacle.

SUMMARY OF THE INVENTION

The cigarette lighter adaptor includes a housing having a first end and a second end. The first end of the device is a conventional plug that is adapted to plug into a power outlet disposed on a vehicle's dashboard. The first end of the device has a pair of exposed electrical contacts to complete the circuit to the automobile's 12 V DC electrical power source, thereby providing the present invention with power. The second end of the present invention comprises a DC cigarette lighter and a power outlet.

The present invention is adapted so that the cigarette lighter and the outlet can be used simultaneously. The cigarette lighter comprises a depressible heating element that is heated via current from the electrical housing until the heating element reaches a desired temperature, at which point the cigarette lighter pops outwardly, and is ready for use. In the depicted embodiment of the present invention, the electrical housing is a Y-shaped unit having a forked second end. It shall be noted that no claim is being made as to a specific design of the electrical housing. Furthermore, the connection between the second end and the main body portion of the electrical housing is preferably articulated, thereby allowing the position of the second end to be variously configured.

The present invention further comprises an LED light that is adapted to illuminate when the present invention is connected to a 12 V DC electrical power source inside of a vehicle. The LED light ensures that users are able to identify when power is flowing to the device so that they know that the heating element is heating properly.

It is an object of the invention to provide a 12 V DC electrical power source plug that is adapted to connect with a vehicle power source in order to provide a second auxiliary power outlet as well as a cigarette lighter.

It is a further object of the invention to provide a device that is highly portable, and operates with any vehicle that includes a 12 V DC power outlet.

These together with additional objects, features and advantages of the cigarette lighter adaptor will be readily apparent to those of ordinary skill in the art upon reading the following detailed description of presently preferred, but nonetheless illustrative, embodiments of the cigarette lighter adaptor when taken in conjunction with the accompanying drawings.

In this respect, before explaining the current embodiments of the cigarette lighter adaptor in detail, it is to be understood that the cigarette lighter adaptor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cigarette lighter adaptor.

It is therefore important that the claims be regarded as including such equivalent construction insofar as they do not depart from the spirit and scope of the cigarette lighter adaptor. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
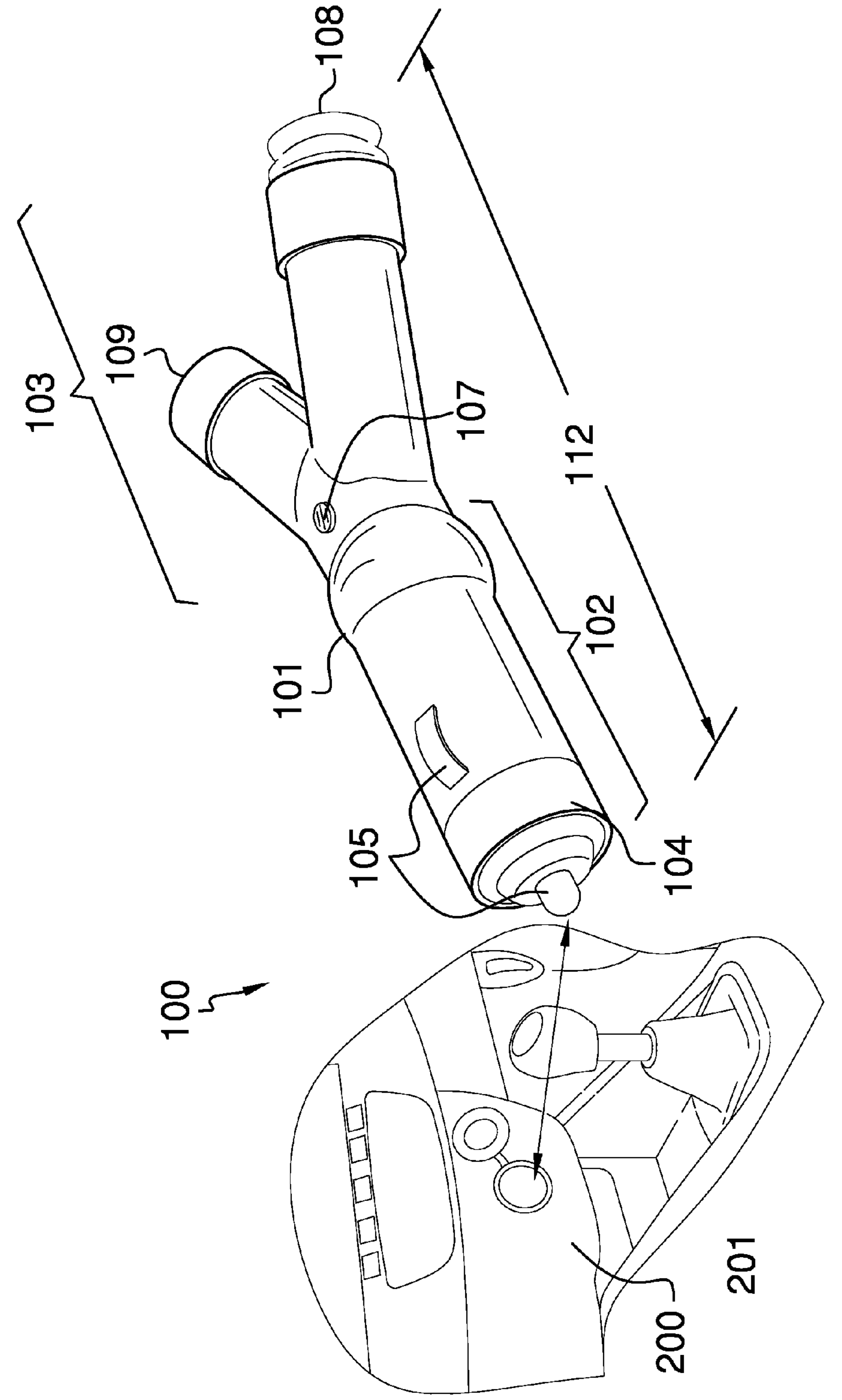
FIG. 1 is a front, perspective view of an embodiment of the disclosure.
Figure 2:
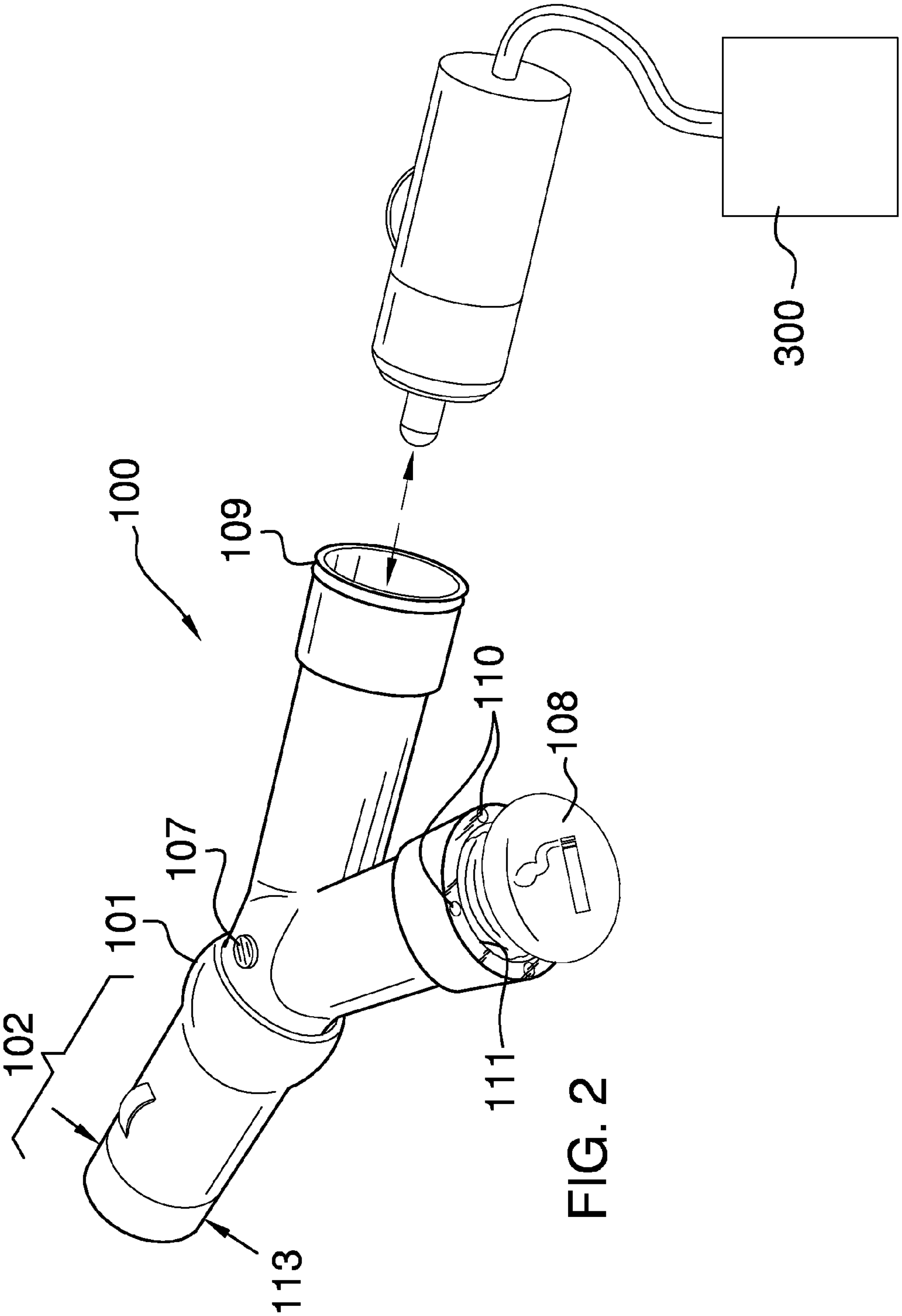
FIG. 2 is a rear, perspective view of an embodiment of the disclosure.
Figure 3:
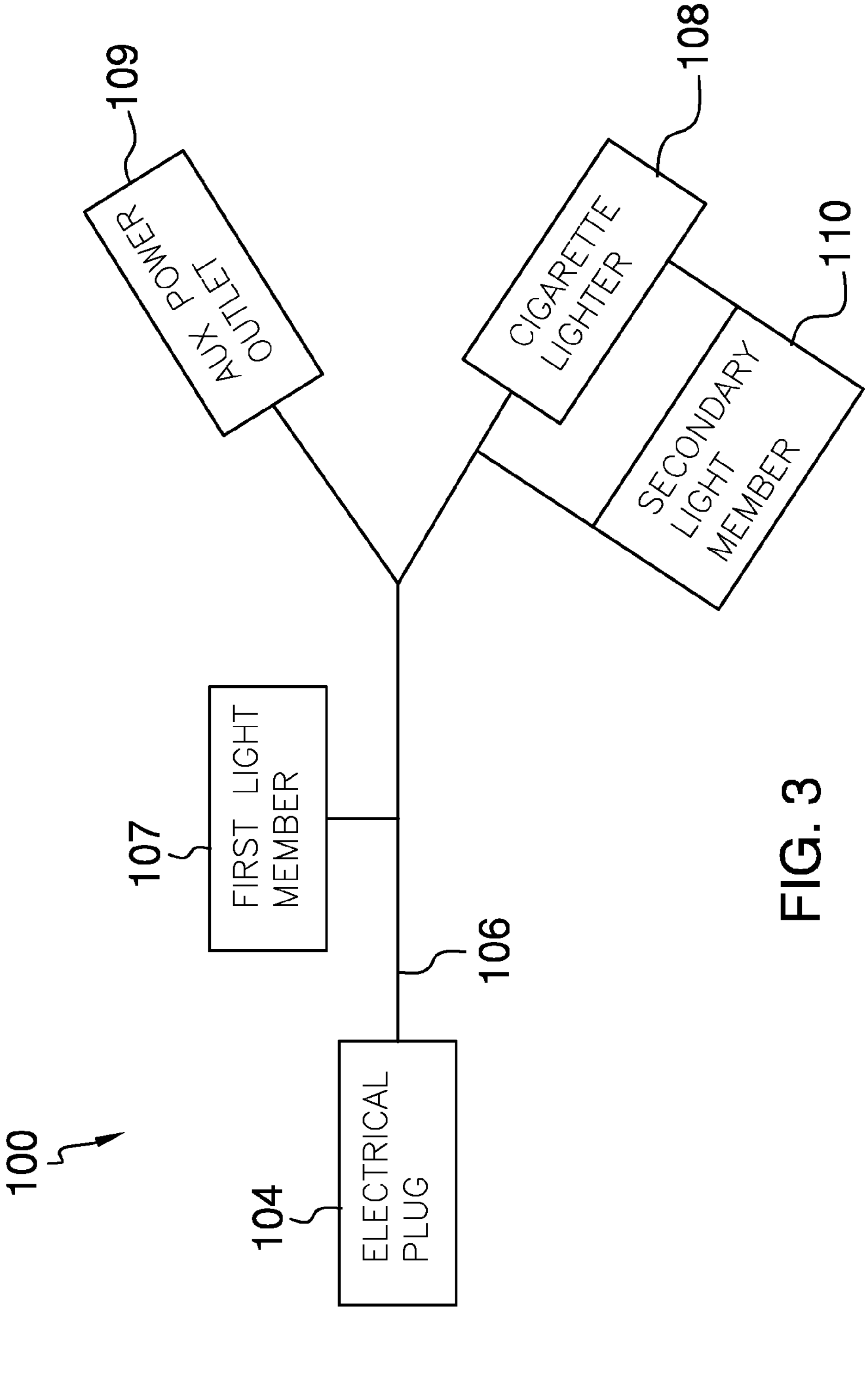
FIG. 3 is a block diagram of componentry associated with an embodiment of the disclosure.

As best illustrated in FIGS. 1 through 3, the cigarette lighter adaptor 100 (hereinafter invention) generally comprises a housing 101 that is further defined with a first end 102 and a second end 103. The first end 102 includes an electrical plug 104 with a pair of exposed electrical contacts 105. The shape of the electrical plug 104 and the pair of exposed electrical contacts 105 are well known in the art, and are adapted to enable electrical connection with a 12 V DC vehicle power outlet 201 of a vehicle 200.

The electrical plug 104 is in wired connection with a supply line 106 that extends within the housing 101. Moreover, the supply line 106 distributes electricity from the electrical plug 104 to all other components associated with the invention 100 and the second end 103 of the housing 101. The supply line 106 is wired to a first light member 107. The first light member 107 is located on the housing 101, and illuminates the illustrate that the invention 100 is connected to the 12 V DC vehicle power outlet 201. The first light member 107 may be a light emitting diode, a fluorescent bulb, an incandescent bulb, etc. The first light member 107 only illuminates when the electrical plug 104 is connected with the 12 V DC vehicle power outlet 201.

The second end 103 of the housing 101 is further defined with as "Y"-shaped, and includes a cigarette lighter 108 as well as an auxiliary power outlet 109. The cigarette lighter 108 is well known in the art, and requires pushing in the cigarette lighter 108 in order to connect with the supply line 106. Upon connection of the cigarette lighter 108 to the supply line 106, a heating element begins to heat, and the cigarette lighter 108 pops out at a predetermined temperature. Connected between the cigarette lighter 108 and the supply line 106 is at least one secondary light member 110.

The at least one secondary light member 110 is used to provide feedback that the cigarette lighter 108 is connected with the supply line 106. Moreover, the at least one secondary light member 110 provides feedback that the cigarette lighter 108 is actually heating up. The at least one secondary light member 110 may be a light emitting diode, a fluorescent bulb, or an incandescent bulb. The at least one secondary light member 110 is located adjacent to and may encircle the cigarette lighter 108.

The auxiliary power outlet 109 is provided on the second end 103 as an opportunity for an electrical device 300 to plug into the invention 100 in order to derive electrical power from the vehicle 200. It shall be noted that the auxiliary power outlet 109 is a female receptacle that is akin of the 12 V DC vehicle power outlet 201. Moreover, the cigarette lighter 108 actually plugs into the same female receptacle as the auxiliary power outlet 109. It shall be noted that the second end 103 actually includes the auxiliary power outlet 109 as well as a cigarette lighter outlet 111. The cigarette lighter outlet 111 is the receptacle that enables the cigarette lighter 108 to be inserted therein. It shall be noted that the auxiliary power outlet 109 may work alone or in concert with the cigarette lighter 108.

The housing 101 is of hollowed construction so as to enable the supply line 106 to extend between the first end 102 and the second end 103. The housing 101 is ideally made of a plastic. Moreover, the housing 101 is further defined with a housing length 112 that is not less than 2 inches. Moreover, the first end 102 where the electrical plug 104 is located is generally cylindrical in shape, and includes a first outer diameter 113 that is consistent with the size associated with vehicle cigarette lighters and the 12 V DC vehicle power outlet 201.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicular cigarette lighter adaptor comprising:

a housing with an electrical plug that is adapted to connect with a vehicle power outlet;

wherein the housing includes a cigarette lighter and an auxiliary power outlet;

wherein the cigarette lighter and the auxiliary power outlet are adapted to connect with the vehicle power outlet;

wherein the housing is further defined with a first end and a second end;

wherein the first end includes the electrical plug with a pair of exposed electrical contacts;

wherein the pair of exposed electrical contacts work in concert with the electrical plug;

wherein the electrical plug is in wired connection with a supply line that extends within the housing;

wherein the supply line distributes electricity from the electrical plug to the cigarette lighter and the auxiliary power outlet;

wherein the supply line is wired to a first light member; wherein the first light member illuminates to provide feedback that the vehicular cigarette lighter adaptor is adaptively in wired connection with the vehicle power outlet;

wherein the first light member is located on the housing;

wherein the second end of the housing is further defined with as "Y"-shaped, and includes the cigarette lighter as well as the auxiliary power outlet;

wherein at least one secondary light member is connected between the cigarette lighter and the supply line;

wherein the at least one secondary light member provides feedback that the cigarette lighter is connected with the supply line; wherein the at least one secondary light member provides feedback that the cigarette lighter is actually heating up;

wherein the at least one secondary light member is a plurality of secondary light members; wherein the plurality of secondary light members is located adjacent to and encircles the cigarette lighter;

wherein the auxiliary power outlet is provided on the second end, and is adapted to connect with an electrical device in order for said electrical device to derive electrical power from the vehicle power outlet;

wherein the housing is of hollowed construction so as to enable the supply line to extend between the first end and the second end.

2. The vehicular cigarette lighter adaptor according to claim 1 wherein the housing is further defined with a housing length that is not less than 2 inches.

* * * * *